US006624226B1

(12) United States Patent
Servaty et al.

(10) Patent No.: US 6,624,226 B1
(45) Date of Patent: Sep. 23, 2003

(54) MOLDED PLASTIC PARTS MADE OF CASTING RESINS AND INORGANIC FILLERS, PRESENTING IMPROVED MECHANICAL AND THERMAL PROPERTIES AND IMPROVED FLAME-RESISTANCE

(75) Inventors: Sabine Servaty, Grosslittgen (DE); Guenther Ittmann, Gross-Umstadt (DE)

(73) Assignee: Roehm GmbH & Co. KG, Darmstadt (DE)

( * ) Notice: Subject to any disclaimer, the term of this patent is extended or adjusted under 35 U.S.C. 154(b) by 0 days.

(21) Appl. No.: 09/762,291

(22) PCT Filed: Jul. 30, 1999

(86) PCT No.: PCT/EP99/05446

§ 371 (c)(1),
(2), (4) Date: Feb. 7, 2001

(87) PCT Pub. No.: WO00/08064

PCT Pub. Date: Feb. 17, 2000

(30) Foreign Application Priority Data

Aug. 7, 1998 (DE) .......................................... 198 35 805

(51) Int. Cl.$^7$ .................................................. C08K 3/10
(52) U.S. Cl. ...................................................... 524/437
(58) Field of Search ......................................... 524/437

(56) References Cited

U.S. PATENT DOCUMENTS 4,183,991 A * 1/1980 Smiley et al. .............. 428/220

FOREIGN PATENT DOCUMENTS

| EP | 0 253 211 A | 1/1988 |
|----|-------------|--------|
| FR | 2 389 645 A | 12/1978 |

* cited by examiner

Primary Examiner—Edward J. Cian
(74) Attorney, Agent, or Firm—Oblon, Spivak, McClelland, Maier & Neustadt, P.C.

(57) ABSTRACT

By copolymerisation of compounds which are acid or have a hydroxy or epoxy function in a casting resin with a filler contents of between 10 and 80%, moulded parts on a polymethylmethacrylate basis are obtained which pass the B1-test even without addition of fire-retardant agents and in addition present improved mechanical properties.

18 Claims, No Drawings ns based on curable acrylic and/or methacrylic acid esters and finely divided inorganic fillers, which resins contain as adhesion promoters organosilicon compounds and metal esters, the casting resin composition containing zirconium acetylacetonate and water.

MOLDED PLASTIC PARTS MADE OF CASTING RESINS AND INORGANIC FILLERS, PRESENTING IMPROVED MECHANICAL AND THERMAL PROPERTIES AND IMPROVED FLAME-RESISTANCE

FIELD OF THE INVENTION

The invention relates to polymerizable resin compounds for manufacture of molded parts of acrylic resin containing large quantities of filler and to the articles that can be made therefrom. The resin compounds have low viscosity as well as little tendency to intrinsic viscosity.

By means of the inventive composition, filled acrylic sheets and plates with high flame retardancy, low smoke development and great ease of handling can be manufactured.

PRIOR ART

The manufacture of plastic articles and molded parts from casting resin is already known. If the casting resins contain high filler contents of, for example, $Al(OH)_3$ (>60 wt %), compared with the polymer matrix of acrylic and/or methacrylic acid esters, the articles manufactured therefrom have high flame resistance. Good mechanical and thermal properties, and especially good forming and thermal shock behavior, can be achieved only by sufficient bonding between polymer matrix and filler. How such binding is achieved also belongs to the prior art.

For filler contents of <60 wt %, the mechanical and thermal properties of the articles already become better because of the lower solids content. The mechanical and thermal properties of the molded plastic parts must be chosen and matched to one another in such a way that the part can be both easily formed and also readily machined by cutting techniques.

On the other hand, the flame resistance becomes poorer at filler contents of <60 wt %, and so appropriate flame retardants would have to be used in order, for example, to pass the B1 test. Unfortunately such additives act as plasticizers, which in turn adversely influences the mechanical and thermal properties.

German Patent 2818954 (Rohm and Haas) describes a polymerizable resin mass comprising a solution of a polymer in a monomer, the polymer being composed of at least 50 wt % of $C_1$ to $C_8$ alkyl methacrylate and 0.01 to 8 wt % of ethylenically unsaturated carboxylic acid units, and the monomer comprising at least 50 wt % of $C_1$ to $C_8$ alkyl methacrylate, a polymerization initiator and, relative to the total weight of the compound, 40 to 80 wt % of inert particulate filler, such as hydrated aluminum oxide, calcium carbonate, clays, silicon dioxide, silicates, metal oxides and $Mg(OH)_2$ and MgO. There can also be added fibrous reinforcing substances. The flame retardancy is achieved by high filler concentrations.

European Patent 253211 (Dynamit Nobel AG) describes casting resins of methacrylic acid esters with a high proportion of aluminum hydroxide or aluminum oxide hydrate as filler. The casting resins each contain a mixture of at least one organosilicon compound with a functional group, one silicic acid ester and one organic metal acid compound of metals of Subgroups IV and/or V of the Periodic Table. The functional group of the organosilicon compound is ethylenically unsaturated and is bonded either directly or via alkylene groups to the silicon atom. The addition of this mixture to the casting resins known in themselves brings about a desirable improvement of the processing properties of the resins by lowering the viscosity. Plastic articles and molded parts manufactured from these resins are characterized by greatly improved use properties.

European Patent 729979 (du Pont) describes casting resins based on curable acrylic and/or methacrylic acid esters and finely divided inorganic fillers, which resins contain as adhesion promoters organosilicon compounds and metal esters, the casting resin composition containing zirconium acetylacetonate and water.

International Patent WO 95/9207 (LVMH Recherche) describes the use of a mixture of block copolymers of acrylic acid or methacrylic acid and $C_1$ to $C_{10}$ alkyl acrylates or $C_1$ to $C_{10}$ alkyl methacrylates, which mixture contains inorganic fillers and an organic solvent, in which the acrylic acid or methacrylic acid and $C_1$ to $C_{10}$ alkyl acrylates or $C_1$ to $C_{10}$ alkyl methacrylates are soluble. These block copolymers are used as wetting and moisturizing agents for inorganic particles. There are also described compositions and cosmetic preparations.

International Patent WO 96/26977 (du Pont) describes a method for achieving good binding between the filler and the plastic. Phosphoric acid esters of esters of acrylic or methacrylic acid with polyhydric alcohols are proposed as binders. Mechanical properties of the molded parts obtained from the mixtures are not described.

European Patent 233199 (Farge) describes polymerizable compositions of methacrylic acid esters and methacrylic acid. The focus of this invention lies in the good intimate binding of fillers such as $SiO_2$ or aluminum powder.

Disadvantages of the Prior Art and Advantages of the Invention

Articles of casting resins based on PMMA with filler contents of less than 60 wt % exhibit improved mechanical properties. The impact strength of a material filled with 60 wt % of $Al(OH)_3$ was 2.8 kJ/m², measured by the Charpy method (DIN 54453, ISO 179). At 55 wt % of $Al(OH)_3$, the Charpy impact strength was 4.5 kJ/m².

This increase of impact strength reduces the risk of fracture of plates manufactured according to the invention during processing and assembly. Even when the edge of a 9-mm-thick plate made of the inventive material (55 wt % of $Al(OH)_3$) was bent over (temperature: 150° C., duration: 3 minutes, bend radius: 50 mm), only slight, acceptable white discoloration of the material occurred, whereas material containing 60 wt % of $Al(OH)_3$ exhibited pronounced and extremely troublesome white discoloration under otherwise identical forming conditions.

During processing by cutting techniques, the plate made of inventive material had a much smaller dust-generation tendency and formed much neater chips during sawing than was the case for comparable plates manufactured according to the prior art instructions.

In order to pass the officially required fire test, for example the B1 test according to DIN 4102, flame retardants must be added. Flame retardants act as plasticizers, and thereby the thermal and mechanical properties become poorer.

Object

The object was therefore to manufacture plastic articles containing fillers of particulate, inorganic fillers such as Al(OH)$_3$, which articles require little or no flame retardant, so that the mechanical and thermal properties are not impaired and nevertheless the B1 test according to DIN 4102 is passed.

Achievement

It was found that, with the use of an unsaturated acid compound, the mechanical and thermal properties become better both at high and also at low filler contents by using an unsaturated compound containing hydroxy functions and/or by using an unsaturated compound containing epoxy functions. Furthermore, an increase in flame resistance can be observed at filler contents of less than 60 wt %.

The increase of flame resistance at filler contents of ≦60 wt % was not to be expected.

At higher filler contents of more than 60 wt % of Al(OH)$_3$, B1 according to DIN 4102 is satisfied because of the high solids content, while above and beyond this the mechanical properties are improved by the addition of the unsaturated compounds described hereinabove.

At filler contents of <60 wt %, B1 according to DIN 4102 is satisfied and the mechanical properties are improved by the addition of the unsaturated compounds described hereinabove.

This synergistic effect is presumably based on the one hand on improved binding between polymer matrix and filler and on the other hand on a swelling effect of the functional compound.

Among the unsaturated acid compounds there are included:
vinyl-group-containing polymerizable acids, such as methacrylic acid, acrylic acid, maleic acid, fumaric acid or itaconic acid,
sulfonic acids, such as styrenesulfonic acid,
acid phosphorus compounds (except for phosphoric acid itself, such as 2-methacryloyloxyethyl phosphate
aromatic monocarboxylic or dicarboxylic acids substituted by one or more vinyl groups, such as styrenecarboxylic acid.

There can also be used the imides, amides, anhydrides and esters of the carboxylic acids listed in the foregoing, examples being methacrylamide or maleic anhydride.

Among the hydroxylated compounds there are included hydroxylated esters of acrylic acid or methacrylic acid, such as hydroxypropyl methacrylate, 2-hydroxyethyl methacrylate, 2-hydroxyethyl acrylate.

Among the epoxy-group-containing compounds there are included, for example, glycidyl methacrylate.

As fillers there are used various types of inorganic particles, such as aluminum oxide/oxide hydrate and magnesium hydroxide.

Especially preferably there are used aluminum hydroxide and aluminum oxide hydrate.

As regards the inorganic fillers, it is advisable that the mean particle size of the filler particles does not exceed 100 $\mu$m (diameter), preferably 75 $\mu$. Besides fillers with monodisperse size distribution, there can also mixtures of at least 2 components, the mean average particle sizes of which are chosen such that a size ratio between the mean average particle sizes of the large filler particles and those of the small filler particles ranges between 10:1 and 2:1, preferably between 6:1 and 4:1. In this connection, filler particles with a particle size of <0.1 $\mu$m must not amount to more than 10% of the volume of all filler particles.

The particle size is determined by the standard methods, the respective largest dimensions of the particles being used as basis for particle-size determination (for example, see B. Scarleft, Filtration & Separation, page 215, 1965). The ratio between the quantities of large and small filler particles generally ranges between 4:1 and 1:4, preferably 2:1 and 1:2, and especially preferably is 1:1.

The proportion of filler in the casting resins of the present invention is at least 30 wt %. An improvement of the mechanical properties is already achieved at low contents of the inventive compounds. In general, a proportion of 80 wt % is not exceeded, although a filler content of 50 to 80 wt % in the casting resins would be a guide value. For improvement of the thermal properties (fire behavior), a filler content of at least 50 wt % in association with use of the inventive compound is necessary. Production of the fillers in the advised particle sizes can be achieved by known methods, such as crushing and grinding.

EXAMPLES

Example 1 comparison Example

Manufacture of plate material without inventive addition, with 55% Al(OH)$_3$ content.

Sufficient polymethyl methacrylate (PMMA) with a MW of about 400,000 was dissolved in methyl methacrylate (MMA) to ensure that the runout time of the resulting syrup was 150 seconds, measured with a DIN beaker with a runout opening of 4 mm.

In 432.47 g of a syrup prepared in this way there were dissolved 0.03 g of 2,4-dimethyl-6-tert-butylphenol, 0.5 g of glycol dimethacrylate, 1.0 g of soybean lecithin concentrate STA of the Lanco Co. and 10.0 g of diethyl phthalate.

In the dissolver there were introduced into this MMA/PMMA syrup, with moderate stirring, 4.5 g of Aerosil® 200 (Degussa AG), 275 ALCOA® C33 (Alcoa) and 275 g of ALCOA® C333 (Alcoa). The suspension was then dispersed at 20 m/sec for about 10 minutes with the dissolver (type HD 75 of the Getzmann Co., Federal Republic of Germany). On the next day 1.5 g of tert-butyl perneodecanoate (75% in aliphatics) was dissolved in this suspension with a paddle stirrer. The included air bubbles were removed from the suspension by application of a vacuum.

A chamber was constructed using 2 silicate-glass panes (thickness 6 mm) together with a round PVC cord (diameter 4 mm). The suspension described in the foregoing was poured into the cavity of the silicate-glass chamber, and the chamber was closed. The chamber contents were cured in a water bath at 50° C. within 3.5 hours. Final polymerization was performed within 2 hours at a temperature of 110° C. Once room temperature was reached, the chamber was disassembled and the cast blank was removed in the form of a plate with high gloss on both sides.

Example 2

Manufacture of plate material with a relatively large inventive addition of acid, unsaturated compounds with 55% Al(OH)$_3$ content. A procedure analogous to that of Example 1 was followed, but 30 g of methacrylic acid was added to the mixture during preparation of the suspension, the quantity of MMA/PMMA syrup being reduced by 30 g.

Example 3

Manufacture of plate material with a relatively small inventive addition of acid, unsaturated compounds with 55%

Al(OH)₃ content. A procedure analogous to that of Example 1 was followed, but 5.0 g of methacrylic acid was added to the mixture during preparation of the suspension, the quantity of MMA/NPMMA syrup being reduced by 5.0 g.

Example 4 comparison Example

Manufacture of plate material without inventive addition, with 60% Al(OH)₃ content. A procedure analogous to that of Example 1 was followed, but 300 g of ALCOR® C33 and 300 g of ALCOA® C333 were used during preparation of the suspension, the quantity of MMA/PMMA syrup being reduced by 50 g and the outflow time of the syrup was 120 seconds, measured with the 4-mm DIN beaker.

Example 5

Manufacture of plate material with a relatively large inventive addition of acid, unsaturated compound with 60% Al(OH)₃ content. A procedure analogous to that of Example 4 was followed, but 30 g of methacrylic acid was added to the mixture during preparation of the suspension, the quantity of MMA/PMMA syrup being reduced by 30 g.

TABLE OF EXAMPLES

|  | Tensile strength per ISO 527-2/1b/5 [MPa] | Modulus of elasticity per ISO 527-2/1B/5 [MPa] | Bending strength per ISO 178 [MPa] | B1 test per DIN 4102 passed |
|---|---|---|---|---|
| Example 1 (comparison example) | 31.0 | 7100 | 59.0 | no |
| Example 2 | 49.0 | 8300 | 74.0 | yes |
| Example 3 | 46.0 | 8000 | 72.0 | not tested |
| Example 4 (comparison example) | 32.0 | 8000 | 52.0 | yes |
| Example 5 | 50.0 | 9000 | 73.0 | yes |

TABLE 1

| | | | Fire behavior per UL94H13 | | | Mechanical properties | |
|---|---|---|---|---|---|---|---|
| Al(OH)₃ wt % | Addition wt % | Fire behavior VFT | extinquished after (sec) | distance (mm) | | modulus of elasticity (mPa) | Tensile strength (mPa) |
| 55 | — | 2 | | | | 5964 | 25.7 |
| 55 | 3, methacrylic acid | 5 | | | | 8021 | 48.6 |
| 60 | — | 5 | | | | 7791 | 30.9 |
| 60 | 3, methacrylic acid | 5 | | | | 9022 | 49.9 |
| 55 | — | 2 | | | | 6929 | 28.9 |
| 55 | 3, methacrylic acid | 4 | | | | 8554 | 49.3 |
| 55 | 2, methacrylic acid | 4 | | | | 8388 | 48.3 |
| 55 | 1, methacrylic acid | 4 | | | | 8139 | 45.8 |
| 55 | 0.5, methacryiic acid | 3 | | | | 7964 | 45.9 |
| 55 | — | | 15 | 9.6 | | | |
| 55 | 2, methacrylic acid | | 0 | 10.0 | | | |
| 55 | 3, methacrylic acid | | 0 | 5.0 | | | |

TABLE 2

| | | | Fire behavior per UL94H13 | | Mechanical properties | |
|---|---|---|---|---|---|---|
| Al(OH)₃ wt % | Addition wt % | Fire behavior VFT | extinquished after (sec) | distance (mm) | modulus of elasticity (mPa) | Tensile strength (mPa) |
| 55 | — | | 88 | 13.2 | 7532 | 30.2 |
| 55 | 3, methacrylic acid anyhydride | | 39 | 9.6 | 8352 | 38.9 |
| 55 | 3, hydroxypropyl methacrylate | | 53 | 11.0 | 7900 | 37.5 |
| 55 | 3, maleic anhydride | | 42 | 10.8 | 7482 | 35.2 |
| 55 | 3, maleic acid | | 39 | 11.6 | 8473 | 44.5 |
| 55 | 3, acrylic acid | | 35 | 11.2 | 8690 | 45.6 |
| 55 | 3, N-methoxymethyl methacrylamide | | 41 | 12.0 | 7479 | 31.0 |
| 55 | 3, methacrylic acid | | 5 | 12.4 | 8020 | 40.6 |
| 55 | 3, 2-hydroxyethyl methacrylate | | 29 | 12.8 | 7442 | 35.8 |
| 55 | 3, glycidyl methacrylate | | 39 | 11.0 | 7582 | 38.9 |
| 55 | 3, 2-methacryloyloxy-ethyl phosphate | bond | | | | |

TABLE 3

| CREANIT® | Al(OH)₃ | Satisfies B1 | Flue gas temperature °C. | Residual lengths (cm) |
|---|---|---|---|---|
| Roma 3525 | 55 | no | 211 | 17, 20, 21, 19 |
| Montreal 3726 | 60 | yes | 170 | 60, 58, 58, 59 |
| Montreal 3726 | 60 | yes | 170 | 55, 57, 53, 58 |
| Kent 3002 | 66 | yes | 167 | 31, 32, 33, 31 |
| Kent 3002 | 66 | yes | 198 | 19, 17, 17, 17 |

By Creanit® there is understood a plate material of polymethyl methacrylate which is filled with inorganic or other fillers. The designations ROMA, MONTREAL and KENT represent color numbers. The material is marketed by Röhm GmbH.

What is claimed is:

1. A polymerizable resin composition, comprising:
   10 to 80 wt % of a filler based on the weight of said polymerizable resin composition;
   0.01 to 5.0 wt % of at least one polymerizable resin compound selected from the group consisting of glycidyl methacrylate, methacrylic acid anhydride, hydroxypropyl methacrylate, maleic anhydride, maleic acid, N-methoxymethylmethacrylamide, 2-hydroxyethyl methacrylate and 2-methacryloyloxyethyl phosphate;
   0.01 to 5.0 wt % of a cross-linking agent; and
   not more than 5 wt % of a flame retardant.
2. The polymerizable resin composition according to claim 1, wherein said filler is Al(OH)₃.
3. A molded part obtained by molding of the composition according to claim 1.
4. A method of manufacturing a molded part, comprising:
   molding the composition of claim 1 to obtain said molded part.
5. The polymerizable resin composition according to claim 1, comprising 10 to 60 wt % of said filler based on said polymerizable resin composition.
6. The polymerizable resin composition according to claim 1, wherein said filler is aluminum hydroxide, aluminum oxide, aluminum oxide hydrate or magnesium hydroxide.
7. The polymerizable resin composition according to claim 1, wherein said filler has a particle size of not more than 100 µm.
8. The polymerizable resin composition according to claim 1, wherein said filler has a monodisperse particle size distribution.
9. The polymerizable resin composition according to claim 1, wherein said filler comprises particles of at least two different sizes.
10. The polymerizable resin composition according to claim 1, wherein a filler having a particle size of <0.1 µm does not exceed an amount of 10% of the volume of a total of all filler particles.
11. The polymerizable resin composition according to claim 1, comprising polymethyl methacrylate and methyl methacrylate.
12. The polymerizable resin composition according to claim 1, comprising glycidyl methacrylate.
13. The polymerizable resin composition according to claim 1, wherein the polymerizable resin compound is partially or fully polymerized.
14. An acrylic plate obtained by curing the polymerizable resin composition of claim 1.
15. The polymerizable resin composition according to claim 1, comprising methacrylic acid anhydride.
16. The polymerizable resin composition according to claim 1, comprising hydroxypropyl methacrylate.
17. The polymerizable resin composition according to claim 1, comprising N-methoxymethylmethacrylamide.
18. The polymerizable resin composition according to claim 1, comprising maleic anhydride.

* * * * *